J. L. McCULLOCH.
CULTIVATOR.

No. 176,438. Patented April 25, 1876.

Attest:
Charles E. Reed
Parker G. Ross

Inventor:
John L. McCulloch

UNITED STATES PATENT OFFICE.

JOHN L. McCULLOCH, OF DAVENPORT, IOWA.

IMPROVEMENT IN CULTIVATORS.

Specification forming part of Letters Patent No. 176,438, dated April 25, 1876; application filed August 18, 1875.

*To all whom it may concern:*

Be it known that I, JOHN L. McCULLOCH, of Davenport, Scott county, State of Iowa, have invented a Cultivator for Cultivating Garden-Vegetables, of which the following is a specification:

Said improvement in cultivators is intended for hand power, and is adapted for use between rows, or upon both sides of a row, to suit the convenience of the operator.

Figure 2:
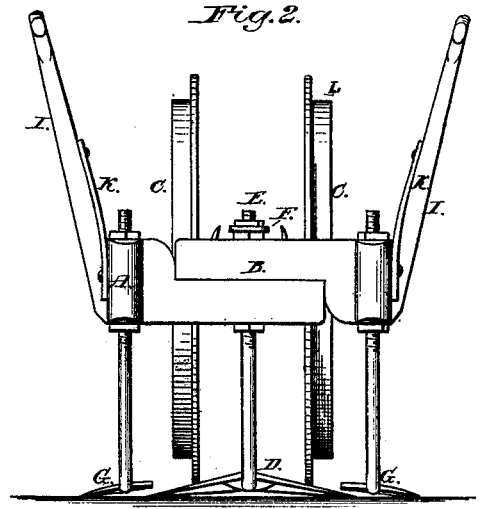

The object of my invention is to pass over the ground with greater rapidity, and less liability to injure the plants, reference being made to the accompanying drawing, Figure 2 of which is a rear view.

Figure 1:
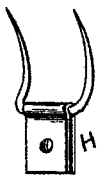

The frame A is made in two sections, with cross-bars B B framed into each section, with slots in them to receive bolts E E, by which the frame A is expanded or contracted to any requisite distance. The wheels C C, which are a part of my invention, are made with a flange or cutting-edge to prevent the moving of the roots or covering the plants. The rims or fellies L L on the outer sides of wheels C C are to govern the depth. The wheels C C are attached to the sides of frame A by a short spindle. The cutting-blade D is placed in the rear of wheels C C, being attached to a standard which passes through a bar, F, fastened to the cross-bars B B with bolts E E. The blades G G, triangular in shape, are attached to standards, which pass through the side pieces of frame A, and work on the outside of wheels C C. Fig. 1 represents a fork hinged underneath the frame A at the front end, for the purpose of lifting the leaves of the plants to prevent the wheels C C from cutting them. The handles I I are fastened to the frame A, and supported by braces K K.

I claim as my invention—

In a garden-cultivator, the combination of the frame adjustable laterally at both ends, the wheels C C having cutting-flanges, and adjusting with the frame, the horizontal weed-culters D G, and the hinged fork H, all arranged and operating substantially as described, and for the purposes set forth.

JOHN L. McCULLOCH.

Witnesses:
CHARLES E. REED,
POTTER G. ROSS.